United States Patent
Boardman et al.

(10) Patent No.: US 9,135,609 B2
(45) Date of Patent: Sep. 15, 2015

(54) SYSTEM AND METHOD TO PURCHASE APPLICATIONS BY A POINT OF SALE TERMINAL

(75) Inventors: Gregory Boardman, Nashville, TN (US); Robert D. Martin, Anthem, AZ (US)

(73) Assignee: HYPERCOM CORPORATION, Scottsdale, AZ (US)

(*) Notice: Subject to any disclaimer, the term of this patent is extended or adjusted under 35 U.S.C. 154(b) by 0 days.

(21) Appl. No.: 12/885,117

(22) Filed: Sep. 17, 2010

(65) Prior Publication Data

US 2011/0010252 A1 Jan. 13, 2011

Related U.S. Application Data

(63) Continuation of application No. 11/282,228, filed on Nov. 17, 2005, now Pat. No. 7,810,723.

(51) Int. Cl.
*G06K 15/00* (2006.01)
*G06K 5/00* (2006.01)
(Continued)

(52) U.S. Cl.
CPC .............. *G06Q 20/123* (2013.01); *G06Q 20/20* (2013.01)

(58) Field of Classification Search
CPC ............ G06Q 20/123; G06Q 20/1235; G06Q 20/127; G06Q 20/1085; G06Q 20/12; G06Q 20/18; G06Q 20/20; G06Q 20/127; G06Q 30/06; G06Q 30/0601; G06Q 30/0631; G06Q 30/00; G06Q 30/0222; G06F 21/10; G06F 21/105; G06F 21/00; G06F 21/31; G06F 8/60; G06F 8/61
USPC ............................... 235/380–383; 705/16, 64
See application file for complete search history.

(56) References Cited

U.S. PATENT DOCUMENTS 5,729,594 A 3/1998 Klingman
6,311,165 B1 10/2001 Coutts et al.
(Continued)

FOREIGN PATENT DOCUMENTS

| EP | 1204054 A2 | 5/2002 |
|---|---|---|
| EP | 1204054 A3 | 10/2004 |
| WO | 2004/012120 A1 | 2/2004 |

OTHER PUBLICATIONS

International Preliminary Report on Patentability, Dec. 16, 2008, PCT/US2006/61024, 7 pages.
(Continued)

*Primary Examiner* — Thien M Le
*Assistant Examiner* — April Taylor
(74) *Attorney, Agent, or Firm* — Stein IP, LLC

(57) ABSTRACT

A system and method to allow users to purchase software applications for point of sale (POS) terminals from an application server via a network (e.g., the Internet) utilizing the POS terminal itself. One or more menus providing portals to available applications and their respective demonstration applications are provided to users on POS terminals. The demonstration applications may be directly downloaded from the application server onto the POS terminals. In addition, the user is able to purchase the application via the POS terminal either before or after the user has viewed/downloaded the demonstration application. After purchase, the application may be downloaded directly from the application server onto the POS terminal. Further, information associated with the demonstration applications downloaded to each POS terminal may be reported to a manufacturer of each demonstration application.

21 Claims, 7 Drawing Sheets

(51) Int. Cl.
    *G06Q 20/00*     (2012.01)
    *G06Q 20/12*     (2012.01)
    *G06Q 20/20*     (2012.01)

(56) References Cited

U.S. PATENT DOCUMENTS

| | | | |
|---|---|---|---|
| 6,547,132 | B1 | 4/2003 | Templeton et al. |
| 6,557,753 | B1 | 5/2003 | Beaujard et al. |
| 6,947,772 | B2 | 9/2005 | Minear et al. |
| 7,603,406 | B2 * | 10/2009 | Gulliver et al. ............... 709/202 |
| 8,620,275 | B2 * | 12/2013 | Minear et al. ............... 455/412.1 |
| 2002/0051164 | A1 | 5/2002 | Watanabe et al. |
| 2002/0124170 | A1 | 9/2002 | Johnson, Jr. |
| 2003/0110094 | A1 * | 6/2003 | Gulliver et al. ................. 705/26 |
| 2003/0120546 | A1 | 6/2003 | Cusack et al. |
| 2003/0147369 | A1 * | 8/2003 | Singh et al. ................... 370/338 |
| 2004/0005925 | A1 | 1/2004 | Yamagishi |
| 2004/0049427 | A1 | 3/2004 | Tami et al. |
| 2004/0088183 | A1 * | 5/2004 | Nakanishi et al. ................. 705/1 |
| 2004/0098344 | A1 * | 5/2004 | Nakanishi et al. .............. 705/52 |
| 2004/0164142 | A1 | 8/2004 | Flugge et al. |
| 2005/0240920 | A1 * | 10/2005 | Yoshimura et al. ........... 717/174 |
| 2006/0053079 | A1 | 3/2006 | Edmonson et al. |
| 2006/0053080 | A1 | 3/2006 | Edmonson et al. |
| 2006/0063590 | A1 * | 3/2006 | Abassi et al. ................... 463/29 |
| 2006/0074766 | A1 | 4/2006 | Pfleging et al. |
| 2006/0253436 | A1 * | 11/2006 | Cook et al. ......................... 707/3 |
| 2008/0270514 | A1 | 10/2008 | Soares Pi Farias |
| 2008/0301231 | A1 * | 12/2008 | Mehta et al. ................... 709/204 |
| 2009/0319393 | A1 | 12/2009 | Gulliver et al. |
| 2010/0115507 | A1 * | 5/2010 | Chatani et al. ................ 717/178 |

OTHER PUBLICATIONS

International Search Report and Written Opinion, Nov. 18, 2008, PCT/US2006/61024, 8 pages.
Notice of Allowance dated Jun. 10, 2010, U.S. Appl. No. 11/282,228, 6 pages.
Non Final Office Action dated Mar. 20, 2009, U.S. Appl. No. 11/282,228, 7 pages.
Non Final Office Action dated Oct. 5, 2009, U.S. Appl. No. 11/282,228, 7 pages.
Examination Report for corresponding Australian Patent Application No. 2006327110, issued Sep. 11, 2009, 2 pages.
Office Action for corresponding Chinese Patent Application No. 200680051012.0, issued Nov. 9, 2010, 16 pages.
Office Action for corresponding Mexican Patent Application No. MX/a/2008/006419, issued Apr. 23, 2010, 3 pages.
Office Action for corresponding Mexican Patent Application No. MX/a/2008/006419, issued Nov. 26, 2010, 3 pages.
Search Report and Search Opinion for corresponding European Patent Application No. 06848662.0, issued Mar. 18, 2011, 20 pages.
A Canadian Office Action dated Mar. 27, 2013, issued in corresponding Canadian Patent Application No. 2,629,883.
U.S. Appl. No. 11/282,228, filed Nov. 17, 2005, Gregory Boardman et al., Hypercom Corporation.
An Office Action dated Apr. 14, 2014, which issued during the prosecution of Canadian Patent Application No. 2,629,883.

* cited by examiner

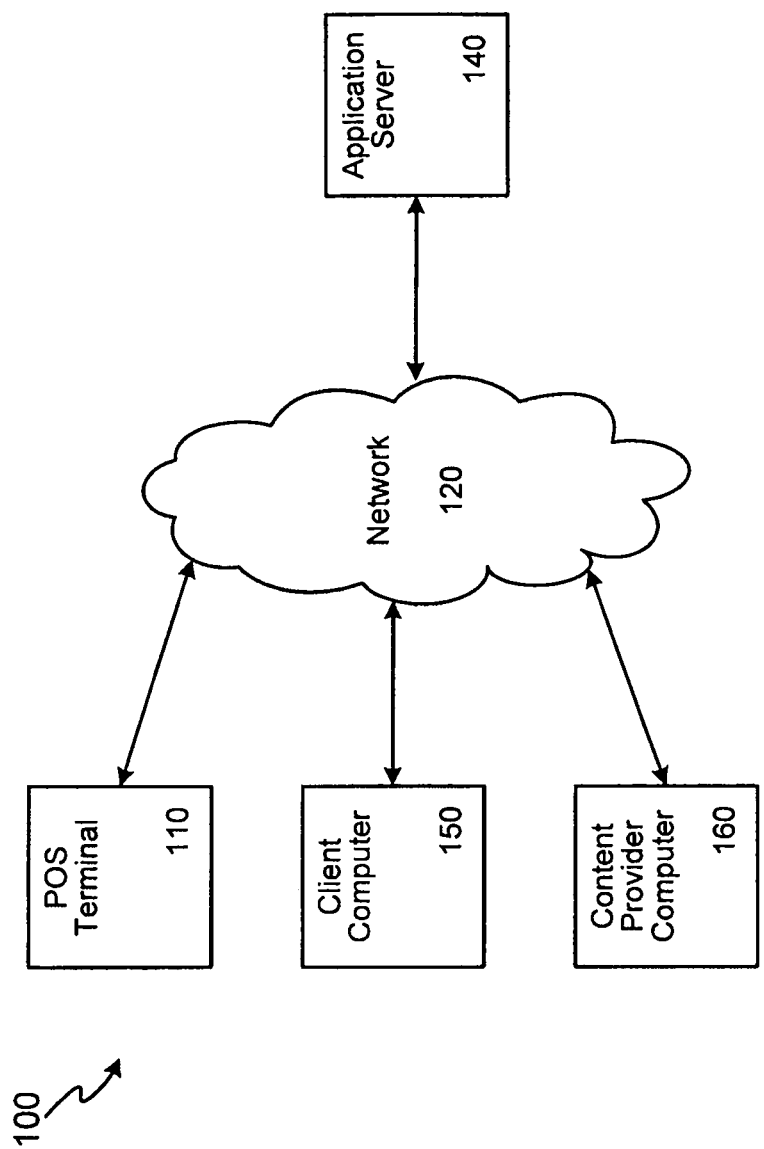

SYSTEM AND METHOD TO PURCHASE APPLICATIONS BY A POINT OF SALE TERMINAL

CROSS REFERENCE TO RELATED APPLICATION

This application is a continuation of, and claims priority to, prior U.S. patent application Ser. No. 11/282,228, filed Nov. 17, 2005.

FIELD OF THE INVENTION

The invention generally relates to point of sale terminals, and particularly to, point of sale terminals with software application purchase capabilities.

BACKGROUND OF THE INVENTION

A point of sale (POS) terminal is generally used to facilitate commercial transactions between a merchant and its customers. Typically, customers present a transaction instrument (e.g., credit card, debit card, charge card, smart card, and the like) to the merchant as payment at the time of purchase. The transaction instrument is inserted into the POS terminal and the POS terminal transmits a request for payment authorization to the financial institution associated with the particular transaction instrument. The POS terminal receives payment authorization or non-authorization for the request and the transaction is completed.

Typically, when the merchant purchases the POS terminal, a POS terminal includes software applications for use by the POS terminal. Over time, these software applications become outdated and/or new software applications become available, which the merchant may be interested in demonstrating and/or purchasing provided the merchant becomes aware of them. Current POS terminals, however, do not provide the ability for the merchant to demonstrate and/or purchase software applications via the POS terminal itself. Thus, merchants are usually unaware of updated versions of software and/or that there are new software applications available terminals until a salesperson notifies the merchant of such. Therefore, there is a need in the art for a system and method that allows merchants to demonstrate and/or purchase software applications for their POS terminal utilizing the POS terminal itself.

SUMMARY OF THE INVENTION

A computer-implemented method to allow a user to download an application for a point of sale (POS) terminal utilizing the POS terminal according to various exemplary embodiments of the invention includes the steps of requesting a demonstration application from a POS terminal, downloading the demonstration application from the POS terminal, and reporting information associated with the demonstration application to a manufacturer of the demonstration application. In accordance with another exemplary embodiment, the method includes the step of generating a purchase request from the POS terminal prior to allowing the POS terminal to download the application. In another exemplary embodiment, the method includes the step of downloading an application associated with the demonstration application the server. In addition, the method may include the step of providing a menu on the POS terminal, wherein the menu includes a portal to where the application may be downloaded. Moreover, the method may include the step of the application server providing a second menu to the POS terminal, wherein the second menu includes a plurality of portals to a plurality of applications, and one of the portals is the portal to the application discussed above. In accordance with an aspect of one exemplary embodiment, each of the applications is available for purchase and/or demonstration.

A system to allow a POS terminal to download an application from a server computer according to various exemplary embodiments of the invention includes an application server in communication with a merchant POS terminal via a network, wherein the POS terminal is configured to download an application demonstration from the server. The server is further configured to report information associated with the demonstration application to a manufacturer of the demonstration application. In another exemplary embodiment, the POS terminal is configured to generate a purchase request prior to downloading the application. In another exemplary embodiment, the POS terminal is configured to download an application associated with the demonstration application.

BRIEF DESCRIPTION OF THE DRAWINGS

A more complete understanding of the present invention may be derived by referring to the detailed description and claims when considered in connection with the drawing Figures, where like reference numbers refer to similar elements throughout the Figures, and FIG. 1A is a block diagram of an exemplary embodiment of a system to allow a user to demonstrate and/or purchase applications for a point of sale (POS) terminal utilizing the POS terminal itself;

DETAILED DESCRIPTION OF THE INVENTION

Figure 1B:
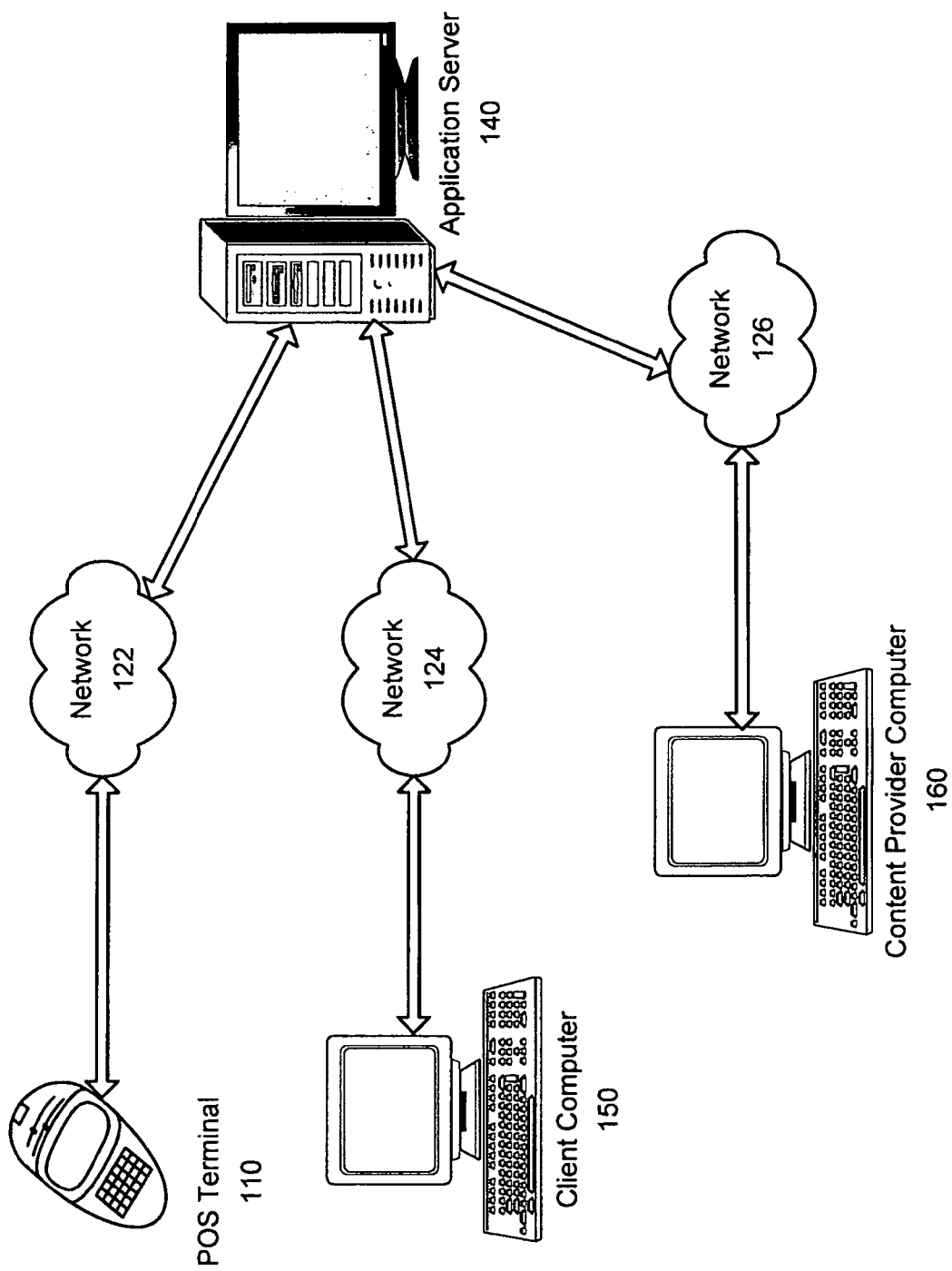
FIG. 1B is a block diagram of another exemplary embodiment of a system to allow a user to demonstrate and/or purchase applications for a point of sale (POS) terminal utilizing the POS terminal itself.

Embodiments of the present invention allow a user (e.g., merchant, retail store employee, restaurant employee, consumer, and the like) to download applications and/or demonstrations of applications from an application server for a point of sale (POS) terminal utilizing the POS terminal itself. By enabling users these download capabilities, users are able to demonstrate and/or purchase new and updated applications with relative ease. The demonstration applications and other applications may be downloaded from a manufacturer of the POS terminal and/or a distributor (client) of the POS terminal, such as a financial processor, independent sales organization, or value added reseller. Moreover, the merchant, distributor, or other party may choose at the time of purchase or license of the POS terminal that the merchant will not participate in the system, wherein users of the POS terminal will not be able to download demonstration applications and other applications.

The following detailed description of exemplary embodiments of the invention makes reference to the accompanying Figures, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the following detailed description is presented for purposes of illustration only and not of limitation. For example, the steps recited in any of the method or process descriptions may be executed in any order and are not limited to the order presented.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

Notably, as used herein, the terms "consumer", "customer", "distributor", "manufacturer", "client", "business", "employee", "user", or "merchant" may be used interchangeably with each other, and each shall mean any person, entity, machine, hardware, software, or business. Furthermore, as used herein, the term demonstration application includes demonstration applications of an application and/or informational applications of the application.

Turning now to the Figures, FIG. 1A is a block diagram of one exemplary embodiment of a system 100 to allow a user to demonstrate and/or purchase applications for a POS terminal 110 utilizing POS terminal 110 itself. POS terminal 110 may be any device, software, and/or component(s) suitably configured to facilitate a commercial transaction between a merchant and a customer utilizing a transaction instrument (e.g., credit card, debit card, charge card, smart card, and the like). Thus, POS terminal 110 may be any POS terminal known in the art or developed in the future. In accordance with an aspect of one exemplary embodiment of the invention, POS terminal 110 is an Optimum T4100 terminal manufactured by Hypercom Corporation of Phoenix, Ariz., although any POS terminal manufactured by Hypercom Corporation is certainly contemplated by the invention.

POS terminal 110, according to various embodiments of the invention, includes a transaction instrument reader (e.g., magnetic stripe reader, a smart card reader, a radio frequency reader, and the like); various electronic circuits for processing a commercial transaction; a housing for the POS terminal; and user interface components including one or more of the following: a display for presenting and/or receiving transaction information; and a keypad including numeric, alphanumeric, and/or function keys. POS terminal 110 may be used with any number of transaction instruments, and thus, may provide for interchangeable or supplemental transaction instrument interfaces. For example, in one embodiment, a magnetic stripe reader module may be detached from POS terminal 110 housing and a smart card reader module attached to the housing in its place. Wireless capabilities may also be incorporated into POS terminal 110 to provide portability. Periphery devices for use with POS terminal 110 may include printers, additional displays, personal identification number (PIN) entry pads, alphanumeric keyboards, voice prompt systems, signature capture devices, bar code reader, and biometric reader. Furthermore, POS terminal 110 may be a stand alone unit or may be integrated into an electronic cash register (ECR), a vending machine, a self check-out kiosk, and the like.

In addition, POS terminal 110 includes a terminal identifier such that POS terminal 110 may be identified as the POS terminal that made a purchase when a user utilizes POS terminal 110 to purchase applications. In accordance with an aspect of one exemplary embodiment, the terminal identifier may be a serial number assigned to POS terminal 110 that is unique across multiple POS terminal populations (i.e., industries). In another aspect of the invention, the terminal identifier may be a digital signature that POS terminal 110 utilizes to identify itself when downloading and/or purchasing applications and/or demonstration applications.

Furthermore, POS terminal 110 can be used in conjunction with any type of personal computer, network computer, workstation, minicomputer, mainframe, or the like running any operating system such as any version of Windows, Windows XP, Windows NT, Windows 2000, Windows 98, Windows 95, MacOS, OS/2, BeOS, Linux, UNIX, Solaris, or the like. Moreover, although the invention is implemented with TCP/IP (Transmission Control Protocol/Internet Protocol) or Point-to-Point Protocol (PPP) communications protocols, it will be readily understood that the invention could also be implemented using IPX, Appletalk, IP-6, NetBIOS, OSI, or any number of existing or future protocols. Moreover, the system contemplates the use, sale, or distribution of any goods, services, or information over any network having similar functionality described herein.

POS terminal 110, in one exemplary embodiment, is connected to a network 120, wherein network 120 may be any software and/or hardware component(s) suitably configured to facilitate electronic communications between POS terminal 110 and an external computing device (e.g., application server 140, which is discussed below). Exemplary networks or communication channels include, but are certainly not limited to, a telephone network (i.e., dial-up network), an extranet, an intranet, the Internet, online communications, satellite communications, off-line communications, wireless communications, transponder communications, a local area network (LAN), a wide area network (WAN), networked or linked devices, and/or any suitable communication or data input modality.

In addition, POS terminal 110, in one exemplary embodiment, has a secure environment such that POS terminal 110 may be used for secure financial transactions, such as credit transactions and debit transactions. In this manner, POS terminal 110 may be used to download and demonstrate applications from application server 140, without adversely affecting the secure environment of the POS terminal for financial transactions.

In the illustrated implementation, network 120 is embodied as the Internet and is presumed to be insecure and open to eavesdroppers. In this context, POS terminal 110 and/or any computing devices (e.g., application server 140) may or may not be connected to the Internet at all times. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997), all of which are hereby incorporated by reference.

System 100, in one exemplary embodiment, also includes a client computer 150 and an application server 140, both connected to network 120. Client computer 150 may be any computing device and/or system to facilitate the configuration of POS terminal 110. Client computer 150 may be in the form of a network computer, a workstation, a minicomputer, a mainframe computer, a personal computer, a laptop, a notebook, a hand held computer, a set-top box, and the like. Client computer 150 may include other servers or other computing systems including a processor for processing digital data, a memory connected to the processor for storing digital data, an input digitizer connected to the processor for inputting digital data, an application program stored in the memory and accessible by the processor for directing processing of digital data by the processor, a display connected to the processor and memory for displaying information derived from digital data processed by the processor, and one or more databases, each database including client data, merchant data, host institution data, and/or like data that could be used in association with the present invention. As those skilled in the art will appreciate, client computer 150 will typically include an operating system (e.g., Windows XP, NT, 95/98/2000, Linux, Solaris, and the like) as well as various conventional support software and drivers typically associated with computers.

In accordance with another aspect of the invention, system 100, may also include a content provider computer 160 connected to network 120. Content provider computer 160 may be any computing device and/or system that provides applications and/or demonstration applications from a third party content provider such as a value added reseller (VAR). Content provider computer 160 may be in the form of a network computer, a workstation, a minicomputer, a mainframe computer, a personal computer, a laptop, a notebook, a hand held computer, a set-top box, and the like.

In connection with another exemplary embodiment, and with momentary reference to FIG. 1B, POS terminal 110 is connected to a first network 122, and client computer 150 is connected to a second network 124. In this embodiment, application server 140 is connected to first network 122 and second network 124, such that application server 140 can communicate with POS terminal 110 and client computer 150. In accordance with another aspect of this embodiment of the invention, a content provider computer 160 may be connected to a third network 126. Content provider computer 160 may be any computing device and/or system that provides applications and/or demonstration applications from a third party content provider such as a VAR.

Client computer 150 may be in a home or business environment with access to network 120. In an exemplary embodiment, access to the Internet is through a commercially-available web-browser software package. Notably, one skilled in the art will also appreciate that, for security reasons, any databases, systems, or components of system 100 may consist of any combination of databases or components at a single location or at multiple locations, wherein each database or system includes any of various suitable security features such as firewalls, access codes, encryption, de-encryption, compression, decompression, and/or the like.

Each database may be any type of database known in the art, such as relational, hierarchical, object-oriented, and/or similar databases. Common products that may be used to implement the databases include DB2 by IBM of White Plains, N.Y.; any of the database products available from Oracle Corporation of Redwood Shores, Calif.; Microsoft Access or MSSQL by Microsoft Corporation of Redmond, Wash.; or any other suitable database product. Each database may be organized in any suitable manner, including organized as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Client computer 150 may be suitably configured to set up and configure POS terminal 110. Client computer 150 contains software that controls which applications that terminal 110 may access from application server 140. In accordance with one aspect of the present invention, client computer 150 may use the terminal identifier of POS terminal 110 to permit access to certain applications from application server 140, and to prohibit access to other certain applications from application server 140. The access to applications may be determined on a terminal by terminal basis, or for a class of terminals, such as all POS terminals in restaurants, or for the entire set of terminals in communication with client computer 150. For example, POS terminals in convenience stores may be able to access an application for ID verification (that is, an application used to verify that a consumer is old enough to purchase liquor or some other item such as cigarettes), while POS terminals in another type of location, such as office supply stores, may not be able to access ID verification applications, as there is no need to verify the age of a consumer in an office supply store.

Application server 140 may be any software and/or hardware suitably configured to store one or more downloadable applications for a POS terminal and/or downloadable demonstration applications for each of the applications, and configured to allow POS terminal 110, when appropriate, to download the application(s) and demonstration application(s). Furthermore, the invention contemplates that application server 140 may be any application server known in the art or developed in the future.

In one exemplary embodiment, application server 140 is suitably configured to retrieve the terminal identifier in POS terminal 110 when POS terminal 110 purchases and/or downloads software applications to track which entity is making the purchase or downloading the application. Furthermore, application server 140 may be configured to keep track of the number of applications downloaded from it. Moreover, application server 140 may be auditable for the number of specific applications downloaded by POS terminals within a particular population or industry, the number of specific applications downloaded across populations or industries, and/or all applications downloaded by a specific terminal.

In accordance with one exemplary embodiment of the invention, the application(s) or demonstration application(s) are compiled machine code applications configured to run within the framework application of POS terminal 110. In another exemplary embodiment, the application(s) or demonstration application(s) are compiled machine code applications configured to run independent of the framework application of POS terminal 110. The application(s) or demonstration application(s), in yet another exemplary embodiment, are written in computer language that is interpreted and displayed by the framework application of POS terminal 110 involving screen flows and actions. In still another exemplary embodiment of the invention, the application(s) or demonstration application(s) are provided in American Standard Code for Information Interchange (ASCII) text form.

POS terminal 110, application server 140, and client computer 150 may be coupled to network 120 via data links. A variety of conventional communications media and protocols may be used for data links. For example, a connection to an Internet Service Provider (ISP) over the local loop may be used in connection with standard modem communication, cable modem, Dish networks, ISDN, Digital Subscriber Line (DSL), or various wireless communication methods. System 100 might also reside within a local area network (LAN) which interfaces to network via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

In operation, system 100 functions to allow POS terminal 110 to download software applications or demonstration applications from application server 140. In accordance with one exemplary embodiment of the invention, system 100 is configured such that POS terminal 110 is able to only download applications and/or demonstration applications from application server 140. In accordance with an aspect of one exemplary embodiment of the invention, application server 140 stores one or more applications and/or demonstration applications offered by the manufacturer of POS terminal 110. The user (via POS terminal 110) may download the demonstration application prior to purchasing the actual application, or may simply wish to purchase the application, wherein application server 140 permits POS terminal 110 to download the application after it has been purchased.

In accordance with another aspect of the invention, application server 140 stores one or more applications and/or demonstration applications offered by the manufacturer and/or distributor (client) of POS terminal 110. In accordance with this aspect of the invention, the user may download demonstration applications, and/or purchase and download applications similar to the aspect discussed above. Furthermore, when an application of the distributor is purchased by the user, application server 140 notifies the distributor. The distributor may be notified each time an application is purchased and/or on a batch basis at the end of a pre-determined period of time (e.g., daily, weekly, monthly, quarterly, semi-annually, yearly, and the like), and an appropriate payment (e.g., a royalty, set fee, and the like) may be made to the distributor. Thus, in accordance with one embodiment of the invention, system 100 may be characterized as a "manufacturer hosted" system. Alternatively, in accordance with another embodiment of the present invention, application server may be maintained by a third party, and system 100 may be characterized as a "third party hosted" system.

Figure 2:
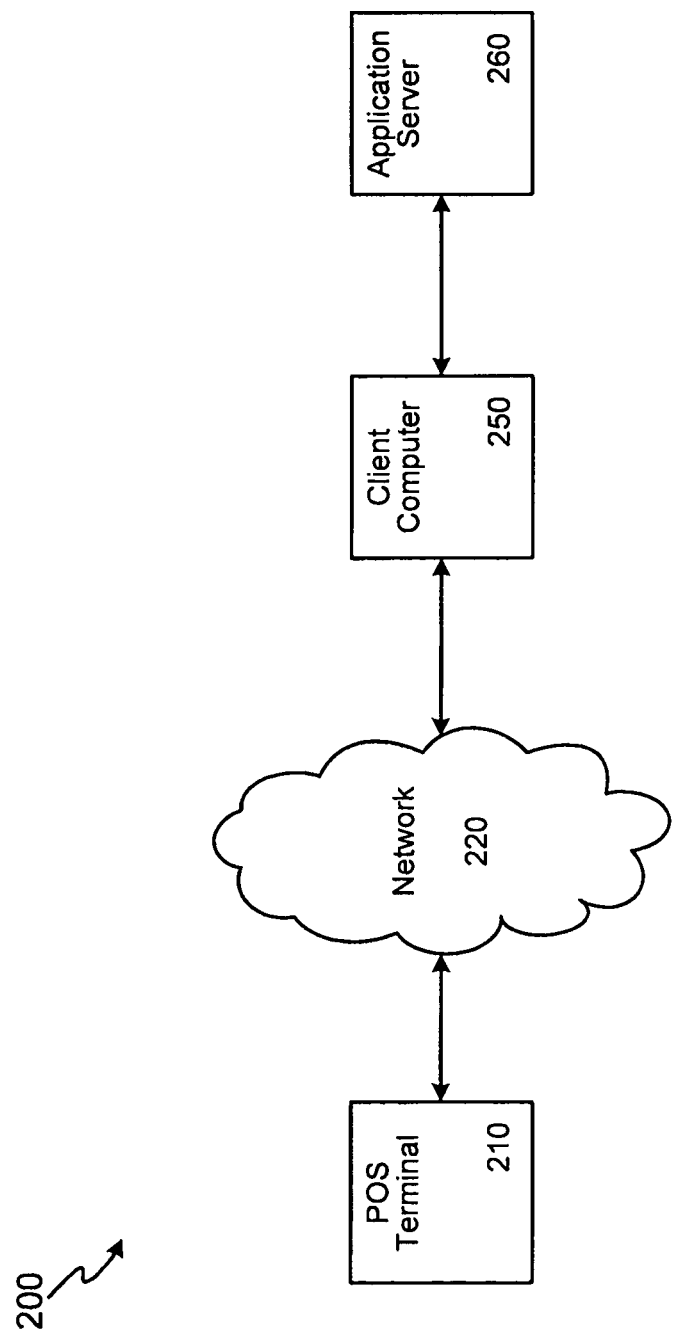
FIG. 2 is a block diagram of another exemplary embodiment of a system to allow a user to demonstrate and/or purchase applications for a POS terminal utilizing the POS terminal itself.

FIG. 2 is a block diagram of another exemplary embodiment of a system 200 to allow a user to demonstrate and/or purchase software applications for a POS terminal 210 utilizing POS terminal 210 itself. System 200, in various exemplary embodiments, includes POS terminal 210, network 220, client computer 250, and application server 260 similar to POS terminal 110, network 120, client computer 150, and application server 140 discussed above with reference to FIG. 1A. In accordance with one exemplary embodiment, application server 260 stores applications and/or demonstration applications of the applications which are downloadable by POS terminal 210. The demonstration applications are available for download prior to purchase of the applications similar to embodiments discussed above. Furthermore, the applications are available for purchase either before or after the user has viewed/downloaded the demonstration application similar to embodiments discussed above. Thus, system 200 may be characterized as a "client hosted" or "distributor hosted" system.

Figure 3:
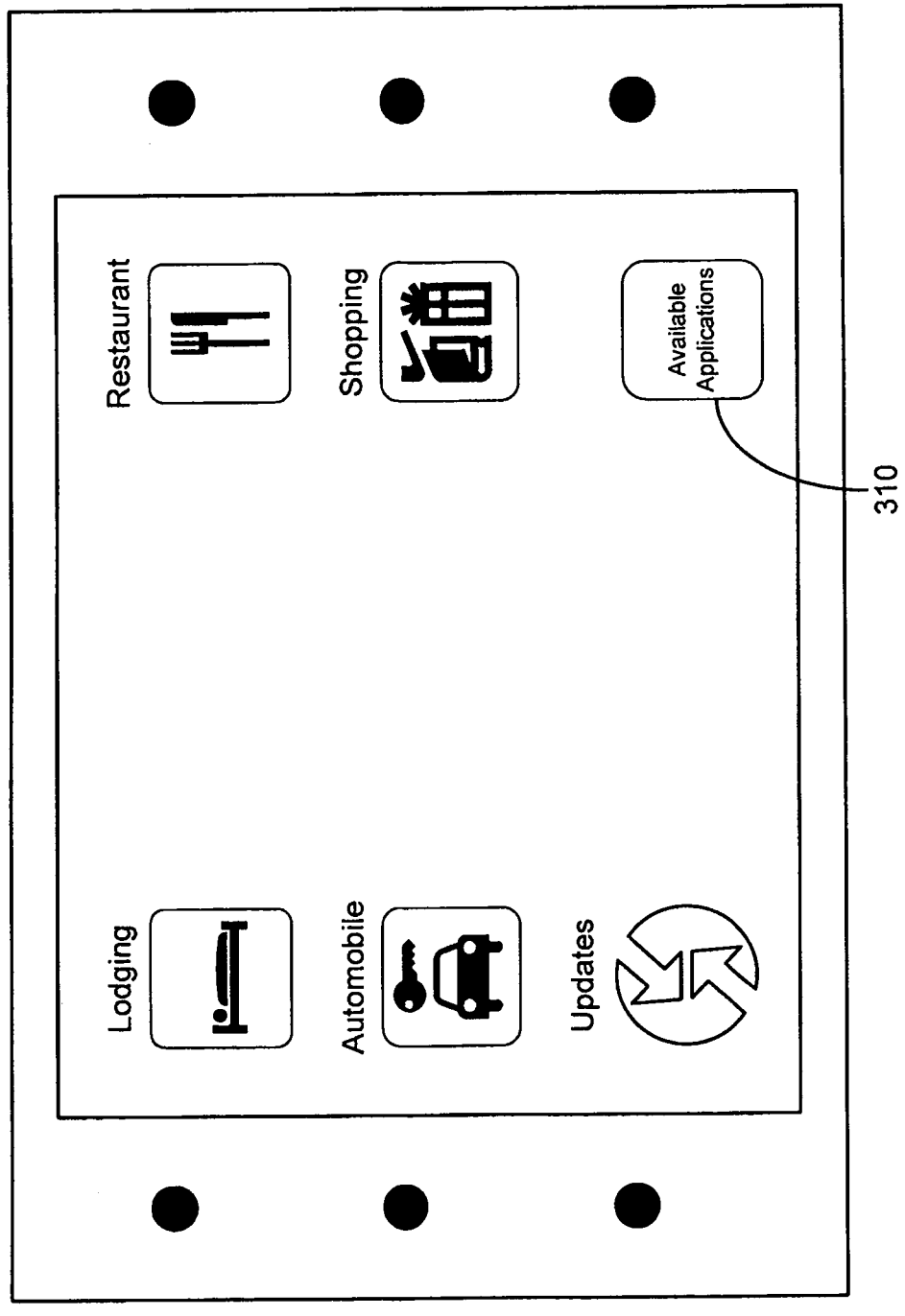
FIG. 3 is a screenshot of one exemplary embodiment of a POS terminal screen illustrating icons of portals/links to various program options.

FIG. 3 is a screenshot of one exemplary embodiment of a POS terminal screen 300 illustrating icons to various program options. In accordance with one exemplary embodiment, screen 300 includes a menu listing portals/links to a lodging platform, an automobile platform, a restaurant platform, a shopping platform, and an update platform. In accordance with another exemplary embodiment, the menu includes a portal/link 310 to an available application platform, wherein a user is able to view a menu of portals/links to available applications and/or available demonstration applications. Notably, while specific platforms have been identified, the invention contemplates that various other platforms may be included on the menu.

Figure 4:
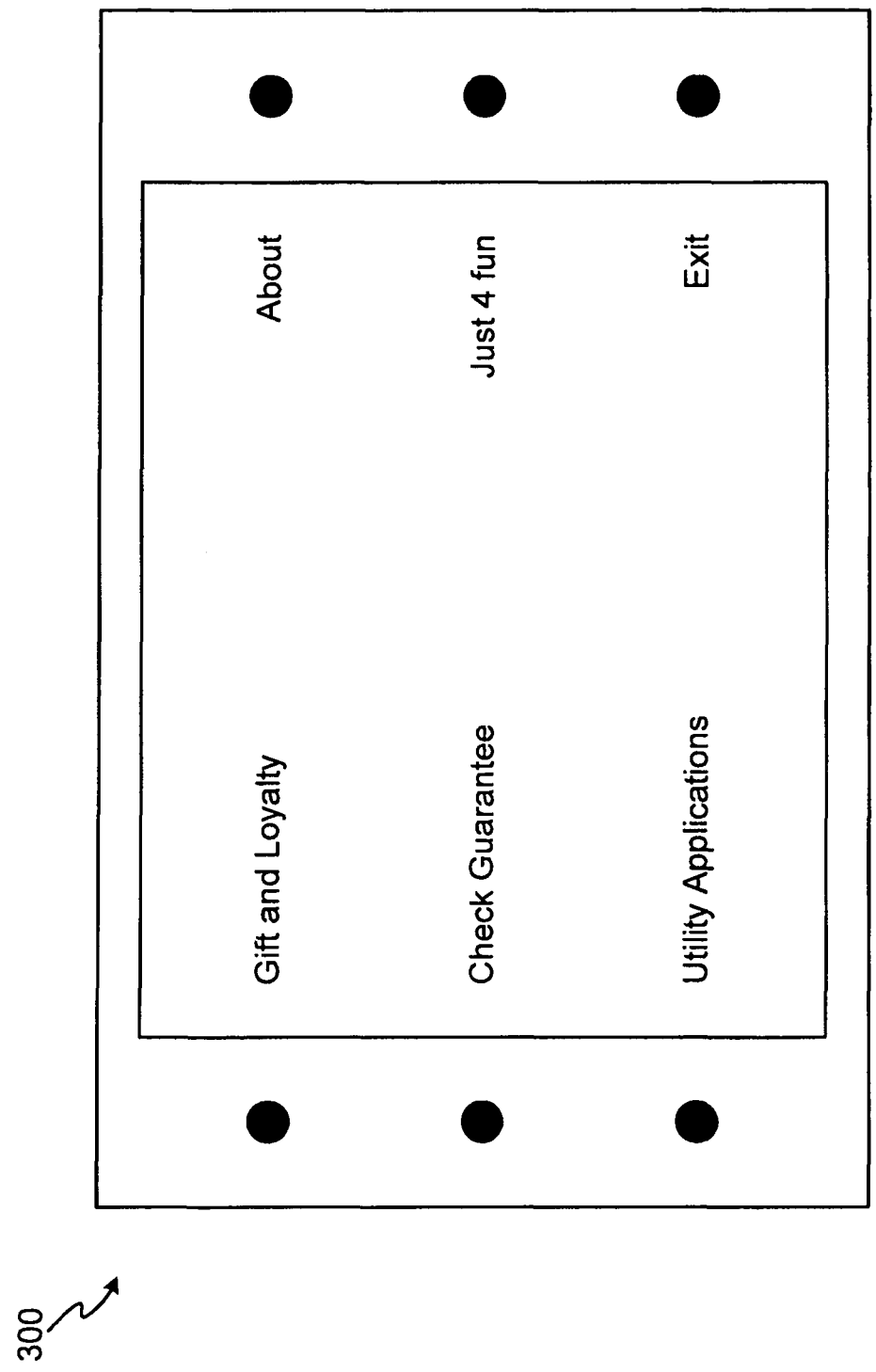
FIG. 4 is a screenshot of the screen of FIG. 3 illustrating a menu of portals/links to downloadable applications and/or demonstration applications from one of the program options discussed in FIG. 3.

FIG. 4 is a screenshot of screen 300 illustrating a menu of portals/links to the available applications and/or available demonstration applications discussed above with reference to FIG. 3. The applications and/or demonstration applications may be any application suitable for downloading onto a POS terminal (e.g., POS terminals 110 and 210). Notably, while specific applications have been illustrated on the menu, the invention contemplates that any application appropriate for downloading onto a POS terminal may be included on the menu Examples of applications that may be downloaded include ID validation software, couponing applications, and games.

Figure 5:
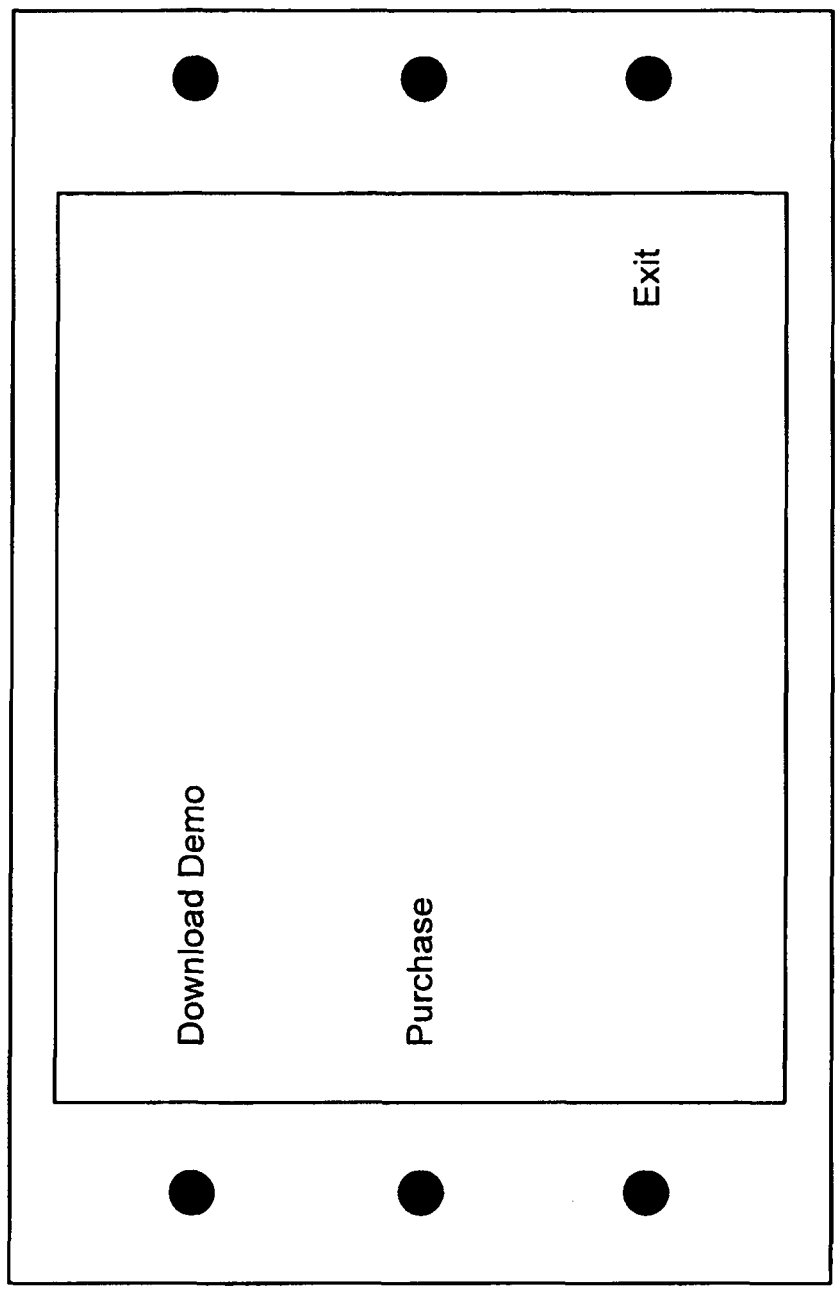
FIG. 5 is a screenshot of one exemplary embodiment of a sub-menu of one of the portals/links illustrated in FIG. 4.

FIG. 5 is a screenshot of one exemplary embodiment of a sub-menu one of the portals/links illustrated in FIG. 4. The sub-menu enables the user to download the demonstration application, and/or purchase and download the application onto a POS terminal (e.g., POS terminals 110 and 210).

Figure 6:
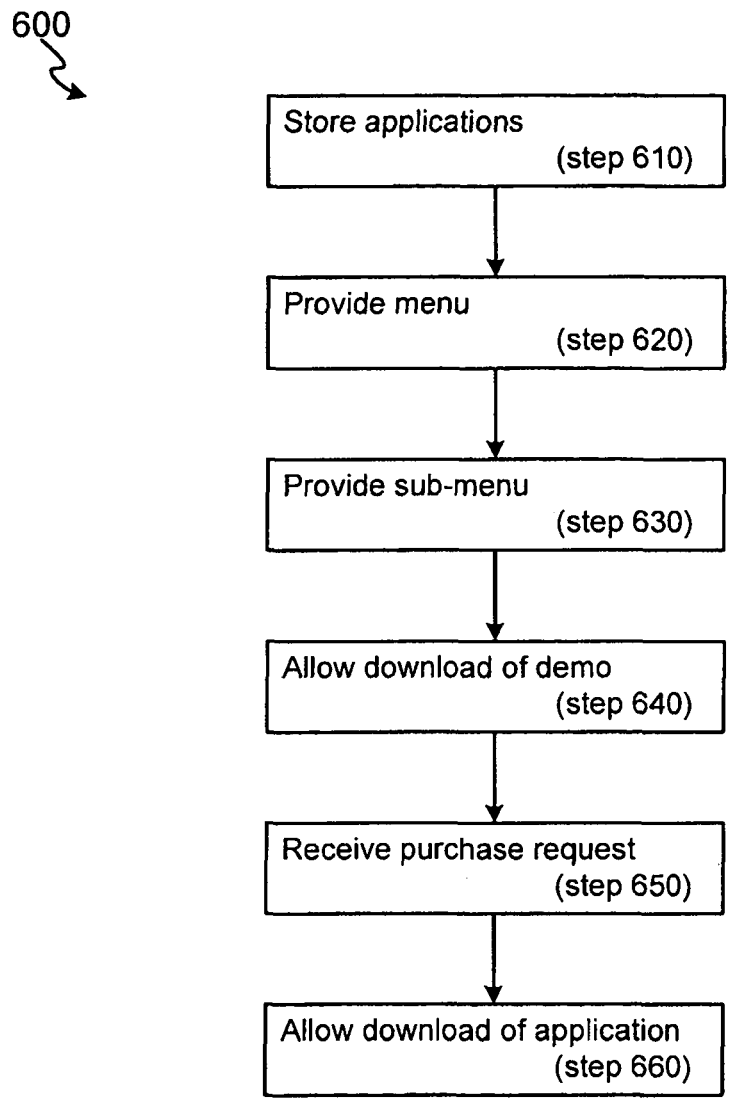
FIG. 6 is a flow diagram of an exemplary method to allow a user to demonstrate and/or purchase applications for a POS terminal utilizing the POS terminal itself.

FIG. 6 is a flow diagram of an exemplary method 600 to allow a user to demonstrate and/or purchase applications for a POS terminal (e.g., POS terminals 110 and 210) utilizing the POS terminal itself. In accordance with one exemplary embodiment of the invention, method 600 initiates by storing applications in an application server (step 610). The applications may be applications for purchase and downloading onto the POS terminal, and/or the applications may be demonstration applications of the applications.

In one exemplary embodiment, method 600 includes the step of providing a menu to a user on the POS terminal (step 620). The menu may include portals/links to several platforms, including a portal/link to a platform wherein the user may download and/or purchase applications and/or demonstration applications. In accordance with one exemplary embodiment of the invention, method 600 includes providing, on the menu, a link/portal to a sub-menu for downloading applications and/or demonstration applications (step 630). Furthermore, method 600 includes the step of allowing the POS terminal to download one or more demonstration applications (step 640). Moreover, method 600 includes receiving a request from a user (via the POS terminal) to purchase one or more applications (step 650), then allowing the POS terminal to download any purchased applications (step 660).

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Moreover, the invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Furthermore, the invention is described herein in terms of functional block components, screenshots, optional selections and various processing steps. It should be appreciated that such functional blocks may be realized by any number of hardware and/or software components configured to perform the specified functions. For example, systems 100 and 200 may employ various integrated circuit components, e.g., memory elements, processing elements, logic elements, look-up tables, and the like, which may carry out a variety of functions under the control of one or more microprocessors or other control devices. Similarly, the software elements of systems 100 and 200 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the systems 100 and 200 may employ any number of conventional techniques for data transmission, signaling, data processing, network control, and the like. Still further, systems 100 and 200 could be used to detect or prevent security issues with a client-side scripting language, such as JavaScript, VBScript, or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

We claim:

1. A system, comprising:
   a point of sale (POS) terminal having access to at least one server computer via a computer network;
   the POS terminal providing a user interface configured to receive a request for a specific demonstration application of an application;
   the POS terminal being configured to transmit the request to the at least one server computer;
   the at least one server computer being configured to determine access to the specific demonstration application based on a terminal identifier of the POS terminal, wherein access is determined based on a class of POS terminals associated with the terminal identifier, said class of POS terminals being determined by a business operating environment of said POS terminal;
   the POS terminal being further configured to download from the at least one server computer the specific demonstration application;
   the POS terminal being further configured to store the specific demonstration application on a computer memory;
   the at least one server computer being configured to collect information about a type of the specific demonstration application that is downloaded by the POS terminal; and
   the at least one server computer being configured to automatically report the information to a manufacturer of the specific demonstration application.

2. The system of claim 1, wherein the POS terminal is further configured to download from the at least one server computer the application associated with the specific demonstration application.

3. The system of claim 2, wherein the user interface is further configured to display a first menu, the first menu comprising a first portal to the application.

4. The system of claim 3, wherein the user interface is further configured to display a second menu, the second menu comprising a plurality of portals to a plurality of applications, wherein one of the plurality of portals is the first portal.

5. The system of claim 1, further comprising a client computer configured to control the access that the POS terminal is granted to the applications.

6. The system of claim 5, wherein the client computer grants the POS terminal access to applications based on a location of the POS terminal.

7. A system, comprising:
a point of sale (POS) terminal having access to at least one server computer via a computer network; wherein,
the POS terminal provides a user interface that receives a request for a specific demonstration application of an application;
the POS terminal transmits the request to the at least one server computer;
the at least one server computer is configured to determine access to the specific demonstration application based on a terminal identifier of the POS terminal, wherein access is determined based on a class of POS terminals associated with the terminal identifier, said class of POS terminals being determined by a business operating environment of said POS terminal;
the POS terminal downloads from the at least one server computer the specific demonstration application;
the POS terminal stores the specific demonstration application on a computer memory;
the at least one server computer collects information about a type of the specific demonstration application that is downloaded by the POS terminal; and
the at least one server computer automatically reports the information to a manufacturer of the specific demonstration application.

8. A system, comprising:
a point of sale (POS) terminal; and
a server computer;
the POS terminal providing a user interface configured to receive a request for a specific demonstration application of an application;
the POS terminal being configured to transmit the request to the server computer via a computer network;
the server computer being configured to determine access to the specific demonstration application based on a terminal identifier of the POS terminal wherein access is determined based on a class of POS terminals associated with the terminal identifier, said class of POS terminals being determined by a business operating environment of said POS terminal;
the POS terminal being further configured to download from the server computer the specific demonstration application;
the POS terminal being further configured to store the specific demonstration application on a computer memory;
the server computer being configured to collect information about a type of the specific demonstration application that is downloaded by the POS terminal; and,
the server computer being configured to automatically report the information to a manufacturer of the specific demonstration application.

9. The system of claim 8, wherein the POS terminal is further configured to download from the server computer the application associated with the specific demonstration application.

10. The system of claim 9, wherein the user interface is further configured to display a first menu, the first menu comprising a first portal to the application.

11. The system of claim 10, wherein the user interface is further configured to display a second menu, the second menu comprising a plurality of portals to a plurality of applications, wherein one of the plurality of portals is the first portal.

12. The system of claim 8, further comprising a client computer configured to control the access that the POS terminal is granted to the applications.

13. The system of claim 12, wherein the client computer grants the POS terminal access to applications based on a location of the POS terminal.

14. A system, comprising:
a point of sale (POS) terminal; and,
a server computer; wherein,
the POS terminal provides a user interface that receives a request for a specific demonstration application of an application;
the POS terminal transmits the request to the server computer via a computer network;
the server computer is configured to determine access to the specific demonstration application based on a terminal identifier of the POS terminal, wherein access is determined based on a class of POS terminals associated with the terminal identifier, said class of POS terminals being determined by a business operating environment of said POS terminal:
the POS terminal downloads from the server' computer the specific demonstration application;
the POS terminal stores the specific demonstration application and the application on a computer memory; and
the server computer collects information about a type of the specific demonstration application that is downloaded by said POS terminal and automatically reports the information to a manufacturer of the specific demonstration application.

15. A method for downloading an application for a point of sale (POS) terminal, the method comprising:
accessing, by the POS terminal, at least one server computer via a computer network;
providing, by the POS terminal, a user interface configured to receive a request for a specific demonstration application of an application;
transmitting, by said POS terminal, the request to the at least one server computer;
determining, by the at least one server computer, access to the specific demonstration application based on a terminal identifier of the POS terminal, wherein access is determined based on a class of POS terminals associated with the terminal identifier, said class of POS terminals being determined by a business operating environment of said POS terminal;
downloading, by the POS terminal, the specific demonstration application;
storing, by the POS terminal, the specific demonstration application on a computer memory;
the at least one server computer being configured to collect information about a type of the specific demonstration application that is downloaded by the POS terminal; and the at least one server computer being further configured to automatically report the collected information to a manufacturer of the specific demonstration application.

16. The method of claim 15, further comprising downloading, by the POS terminal, the application associated with the specific demonstration application.

17. The method of claim 16, wherein the user interface is further configured to display a first menu, the first menu comprising a first portal to the application.

18. The method of claim 17, wherein the user interface is further configured to display a second menu, the second menu comprising a plurality of portals to a plurality of applications, wherein one of the plurality of portals is the first portal.

19. The method of claim 15, further comprising controlling, by a client computer, the access that the POS terminal is granted to the applications.

20. The method of claim 19, wherein the client computer grants the POS terminal access to applications based on a location of the POS terminal.

21. A method for downloading an application for a point of sale (POS) terminal, the method comprising:
  accessing a server computer by way of the POS terminal connected to a computer network;
  receiving a request for a specific demonstration application of the application by way of a user interface displayed on the POS terminal;
  transmitting the request to the server computer;
  determining, by the server computer, access to the specific demonstration application based on a terminal identifier of the POS terminal, wherein access is determined based on a class of POS terminals associated with the terminal identifier, said class of POS terminals being determined by a business operating environment of said POS terminal;
  downloading the specific demonstration application from the server computer;
  storing the specific demonstration application on a computer memory;
  collecting information about a type of the specific demonstration application that is downloaded by the POS terminal; and
  automatically reporting the information to a manufacturer of the specific demonstration application.

* * * * *